United States Patent [19]

Freudenberg et al.

[11] 4,273,911

[45] Jun. 16, 1981

[54] METHOD FOR THE MANUFACTURE OF LOW-MELTING POLYURETHANES HAVING IMPROVED STRENGTH PROPERTIES USING A MIXTURE OF A POLYDIOL HAVING A MOLECULAR WEIGHT BETWEEN 500 AND 5,000 AND A MIXTURE OF AT LEAST THREE DIOLS

[75] Inventors: Bertram Freudenberg; Günter Schuhmacher, both of Weinheim an der Bergstrasse; Horst Mühlfeld, Grasellenbach, all of Fed. Rep. of Germany

[73] Assignee: Firma Carl Freudenberg, Weinheim an der Bergstrasse, Fed. Rep. of Germany

[21] Appl. No.: 116,838

[22] Filed: Jan. 30, 1980

[30] Foreign Application Priority Data

Feb. 17, 1979 [DE] Fed. Rep. of Germany ....... 2906136

[51] Int. Cl.$^3$ ............................................. C08G 18/32
[52] U.S. Cl. ....................................... 528/49; 528/76; 528/80; 528/83
[58] Field of Search ....................... 528/49, 76, 80, 83

[56] References Cited

U.S. PATENT DOCUMENTS

| | | | |
|---|---|---|---|
| 3,252,848 | 5/1966 | Borsellino | 156/307 |
| 3,401,133 | 9/1968 | Grace et al. | 260/29.2 |
| 3,428,609 | 2/1969 | Chilvers et al. | 260/75 |
| 3,684,639 | 8/1972 | Keberle et al. | 161/87 |
| 3,761,439 | 9/1973 | Ward et al. | 528/80 |
| 3,775,354 | 11/1973 | Hostettler et al. | 528/80 |
| 4,098,772 | 7/1978 | Bonk et al. | 528/76 |
| 4,160,686 | 7/1979 | Niederdellmann et al. | 156/331 |

*Primary Examiner*—Maurice J. Welsh
*Attorney, Agent, or Firm*—Kenyon & Kenyon

[57] ABSTRACT

The invention described herein relates to a method for preparing a low-melting polyurethane which comprises the reaction of at least one diisocyanate, at least one polyol having a molecular weight between 500 and 5000, at least one diol which is branched or includes an ether group, and at least one diol which is unbranched. The diols have a molecular weight of less than about 500. The hydroxyl group content of the reaction mixture exceeds or equals the isocyanate content of the reaction mixture.

26 Claims, No Drawings

METHOD FOR THE MANUFACTURE OF LOW-MELTING POLYURETHANES HAVING IMPROVED STRENGTH PROPERTIES USING A MIXTURE OF A POLYDIOL HAVING A MOLECULAR WEIGHT BETWEEN 500 AND 5,000 AND A MIXTURE OF AT LEAST THREE DIOLS

BACKGROUND OF THE INVENTION

It is known to prepare polyurethanes by reacting a prepolymer having isocyanate groups with chain extenders. As a rule products having high molecular weights and high melting points are obtained. Although low-melting polyurethanes are known, the strength properties of such polymers including their tensile strength, percent elongation properties and tear propagation resistance, are poor. However, polyurethanes suitable for use as adhesives for ironing-in materials, as coatings employed in the manufacture of artificial leather, or as protective coatings for materials of any kind, are preferably low-melting polyurethanes having good strength properties.

BRIEF DESCRIPTION OF THE INVENTION

In accordance with the foregoing it is an object of this invention to provide low-melting polyurethane polymers having good strength properties such as tensile strength, ultimate percent elongation, and tear propagation resistance. The polyurethanes of this invention have good adhesive strength and are well suited for use as adhesives and coating materials.

This invention also provides a method for preparing such polyurethanes.

The polyurethanes of this invention may be characterized by their method of preparation which comprises preparing a chain-extended polyurethane from at least one diisocyanate, at least one polyol having a molecular weight between about 500 and 5000, and at least three diols having a molecular weight below about 500, wherein at least one of said diols is branched or includes an ether group, and at least one of said diols is unbranched; and wherein the hydroxyl group content of the reaction mixture exceeds or equals the isocyanate content of the reaction mixture.

The polyurethane may be prepared by heating a solvent-free mixture of the diisocyanate, polyols and low molecular weight diols. The reaction components may be brought into reaction in one step, by heating a mixture of all the reactants, or in several steps. In accordance with the method of this invention the equivalency ratio of isocyanate groups/hydroxyl groups × 100 in the reaction mixture is within the range of from about 96 to 100. The equivalency ratio of branched or ether groups containing diols to unbranched diols in the diol component of the reaction mixture is from about 20:80 to 75:25.

DETAILED DESCRIPTION OF THE INVENTION

In accordance with the method of this invention, low-melting polyurethanes are prepared from diisocyanates, polyols and a mixture of low molecular weight diol chain extenders having a molecular weight of less than about 500. As discussed below and illustrated by the examples, the polyurethane products of this invention may be produced in a single-step reaction by heating a reaction mixture containing the reaction components.

It has been found that a single-step process for the manufacture of polyurethanes can be carried out with good reproducibility, if reaction mixtures having characteristic numbers between about 96 and 100, and preferably between 97 and 99 are employed. The use of such reaction mixtures results in a lowering of the melting point of the product without adversely affecting its strength. Moreover, the reaction is an economical one to run since it may be run without solvent, and simply by mixing the components of the reaction mixture.

The characteristic number of the reaction mixture as that term is employed herein refers to the equivalency ratio of isocyanate (NCO) to hydroxyl groups in the reaction mixture times one hundred:

NCO groups/OH groups × 100 = charactertistic number Thus, an excess of hydroxyl groups in the reaction mixture is maintained up to a ratio of at most about 1:1 of isocyanate to hydroxyl groups. It has been found that when a reaction mixture having an excess hydroxyl group content is employed, secondary reactions which can lead to undesirable high-melting products do not occur—even if temperatures as high as 250° C. are reached as a result of the highly exothermic polyurethane reaction.

The characteristic number should not be less than about 96 since at this point a degrading of the strength of the product may occur. However, if a product having good strength is not required, the maintenance of this characteristic number is not of great importance.

Even with large charges, the reproducibility of the strong, low-melting polyurethanes of this invention is good. Moreover, the necessity for the removal of the intensive heat produced during the reaction, which is customary during polyurethane preparation, is eliminated by the present method.

The low molecular weight diols employed in the reaction mixture have molecular weights below about 500. The diol component of the reaction mixture may comprise a mixture of melting point lowering diols and diols which function primarily to enhance the strength of the product.

Low molecular weight diols which are branched or contain ether groups contribute to the lowering of the melting point of the product. A single melting point lowering diol, or a mixture of melting point lowering diols may be employed. Included within this group of diols are, for example, 2,2'-diethylpropane-1,3-diol, neopentyl glycol, diethylene glycol and 1,5-pentane diol.

Diols which contribute to the strength of the final product are primarily the straight-chain unbranched diols, such as ethylene glycol, 1,4-butane diol and 1,6-hexane diol.

It has been found that a combination of two melting point lowering diols synergistically enhances the lowering of the melting point of the polyurethane product. With the high reaction temperatures employed, it would, in general, be very difficult to prepare a polyurethane having a melting point below about 150° C. if only a single melting point lowering glycol were employed in the reaction mixture. If, however, a combination of two melting point lowering diols is employed in the reaction mixture, products having melting points below about 150° C. are readily obtained. Moreover, when a mixture of a branched glycol, such as neopentyl glycol, and an ether glycol such as diethylene glycol is employed, the combination results in a synergistic improvement in the strength of adhesion of the polyurethane to fibrous materials.

Although a single strength enhancing low molecular weight diol may be employed in the diol mixture, combinations of two or more straight chain diols may also be employed. The use of combinations of strength enhancing diols can further contribute to the lowering of the melting point of the product.

Surprisingly, polyurethanes which are low melting and have improved strength properties are obtained when a mixture of the above-described melting point lowering diols and two or more diols which enhance the strength of the product are employed as the low molecular weight diol components of the reaction mixture. As mentioned above, in addition to the low molecular weight diols, the reaction mixture includes a polydiol or polydiol mixture, as well as one or several diisocyanates. The low molecular weight diol component of the reaction mixture may comprise at least three low molecular weight diols. The low molecular weight diols employed in the mixture have an average molecular weight below about 500. Preferably, at least one of the low molecular diols of the combination is neopentyl glycol, 2,2'diethylpropane-1,3-diol, diethylene glycol or pentane diol, and at least one of the other components of the diol combination is ethylene glycol, 1,4-butane diol or 1,6-hexane diol.

The ratio of primarily melting point lowering low molecular weight diols, to primarily strength enhancing diols can vary. Preferably the equivalency ratio, i.e, mole ratio, of melting point lowering diols to strength enhancing diols ranges from about 20:80 to about 75:25. The content of strength increasing diols can be reduced when the diisocyanate content of the reaction mixture is high. A high diisocyanate content will result in a hard polyurethane product having a high urethane content which contributes considerably to the strength of the polyurethane. On the other hand, softer polyurethanes, having good strength properties and low melting points are obtained when the content of the strength increasing diols predominates in the mixture.

Although the determination of a clear boundary between "soft" and "hard" polyurethanes is practically impossible, such a boundary may be delineated with reference to a medium hardness range obtained when the weight ratio of the diisocyanate to the polydiol component is from about 50 to 70 parts by weight diisocyanate to about 100 parts of the polydiol-especially where the diisocyanate is an aliphatic diisocyanate such as 1,6-hexamethylene diisocyanate and the polydiol is a polyester having a molecular weight of from about 1000 to 2000.

The polydiols and/or polydiol mixtures which are employed as components of the reaction mixture may be described, in general, as compounds having hydroxyl end groups, and having molecular weights above about 500 and up to about 5000. Preferably, the polydiols have a molecular weight between about 1000 and 2000.

The polydiol component of the reaction mixture may be a polyether or a polyester-polydiol. The polyester may be a polyester having an adipic acid base, wherein the diol component of the polyadipate may be one of the following diols or a mixture of one or more of the following diols: ethylene glycol, propane diol, 1,4-butylene glycol, neopentyl glycol, 1,6-hexane diol and others. Polycaprolactone may also be employed as the polydiol component of the reaction mixture. Among the polyethers, polydiols of the tetrahydrofuran type are suitable for use as the polydiol component of the reaction mixture.

The diisocyanate component of the reaction mixture may be an aromatic diisocyanate such as 4,4'-diphenyl-methanediisocyanate (MDI) (or derivatives such as carbodiimide-modified MDI), or ditolyl-diisocyanate. The diisocyanate may also be a cycloaliphatic diisocyanate such as isophorone diisocyanate or an aliphatic diisocyanate such as 1,6-hexane diisocyanate or 2,2,4-trimethyl-1,6-hexane-diisocyanate. As for the polydiol component of the reaction mixture, a single diisocyanate may be employed, or a mixture of diisocyanates may be employed.

It should be noted that in addition to components of the reaction mixture discussed above, i.e., the diisocyanate, polydiol, and low molecular weight diols, optionally small amounts of monofunctional compounds containing active hydrogen may be added to the reaction mixture. Such monofunctional compounds include alcohols, amines or amides such as dibutylamine, neopentyl alcohol, ε-caprolactam and others. The amount of monofunctional compounds employed may be less than 5 mole percent, and preferably less than 3 mole percent of the equivalent total amount of low molecular weight diols employed.

The addition of small amounts of the monofunctional compounds aids in lowering the melting point of the product without adversely affecting its strength. Thus, when a monofunctional compound is employed the amount of one of the melting point lowering diol compounds employed in the mixture of melting point lowering diols may be reduced accordingly. Moreover, when a monofunctional compound is employed, the second melting point lowering component in the diol mixture may be eliminated entirely.

In accordance with the present method, relatively soft polyurethanes with a low urethane content, as well as hard polyurethanes having a relatively high urethane content may be prepared. Thus, the starting temperature for the reaction may vary. The term "starting temperature" is intended to refer to the temperature to which the reaction mixture is initially heated. For example, mixtures of the above-described components for the polyurethane reaction, containing 80 or more parts of a diisocyanate per 100 parts by weight of a polyester having a molecular weight of about 2000, are heated to only about 50° to 60° C. However, the starting temperature is increased as the diisocyanate content of the mixture decreases. For example, the starting temperature is increased to about 100° C. for reaction mixtures containing about 30 parts diisocyanate per 100 parts of a polyester having a molecular weight of about 2000.

As mentioned above, the polyurethanes may be prepared in a simple, single-step manner. The reaction components, liquid or solid, may be simply charged into the reaction vessel in any order, and heated to the requisite starting temperature.

The high temperatures which occur toward the end of the polyurethane reaction do not adversely affect either the quality of the product or the reproducibility of the high quality polyurethanes produced by the process. Advantageously, as a result of the high reaction temperatures, a practically complete conversion of the starting components into the fully reacted polyurethanes takes place in a short time. Moreover, as a result of the final reaction temperatures which may be as high as from about 200° to 240° C., the subsequent processing of the polyurethane, such as the pouring of the polyurethane from the reaction vessel into flat receptacles or onto conveyor belts is facilitated due to the relatively low viscosity of the final product. Under the reaction conditions of the present process, the often required post-tempering to complete the conversion of residual isocyanate into polyurethane is unnecessary. For example, for a reaction mixture containing 100 parts by weight diisocyanate, per 100 parts by weight of polyester, heat is supplied to the reaction mixture until a temperature of about 50° C. is reached. The reaction is complete within 15 to 20 minutes after the starting temperature is reached.

Although it is possible to prepare low-melting polyurethanes by including low-molecular weight glycols such as neopentyl glycol or diethylene glycol in the polyurethane reaction mixture, the product polyurethanes will not be suitable for use as adhesives or as coating materials. Satisfactory results are not obtained if, as is customary, the characteristic number of the reaction mixture is above 100. This is true even if the reaction mixture is supplemented with glycols such as 1,4-butane glycol or 1,6-hexane diol which, experience has shown, enhance the strength and quality of the product. For solventless reaction mixtures having characteristic numbers above 100, an increase in the melting point of the product occurs. The polyurethanes produced have melting points above 150° C., and usually above 200° C. It is believed that the reason for the production of the high melting product is the occurrence of undesirable secondary reactions which occur at high temperatures such as the formation of allophanate and isocyanurate, which results in the branching and crosslinking of the polyurethane molecules. For solventless reactions of reaction mixtures having characteristic numbers of above 100, low-melting products having melting points within the range of the products of the present method are not obtained, even if large amounts of melting point lowering diols are employed. The polyurethane products of this invention may have melting points below about 150° C., for example, within the range of from about 115° to 130° C.

The polyurethanes produced in accordance with the method of this invention have a particularly high tensile strength. The tensile strength of the product polyurethanes measured as per DIN 53371, is higher than about 10N/mm$^2$; for the preferred polyurethanes the tensile strength is above about 15N/mm$^2$. The tensile strength of these polyurethanes renders them well suited for use as adhesive material between two textiles. For example, the polyurethanes may be employed as a spun-bonded adhesive fabric between woven fabrics.

As discussed above, low-melting polyurethanes per se are known. However, known low-melting polyurethanes do not possess the high tensile strength possessed by the polyurethanes of this invention. Known low-melting polyurethanes have been prepared, for example, by employing a reaction mixture containing the bifunctional reactants and large amounts of monofunctional compounds having an active hydrogen such as alcohols or amines. Such a reaction mixture results in the production of relatively short-chained polyurethanes which, understandably, exhibit a poor property profile.

As an alternative to a batch process, polyurethanes may be produced continuously, for example, by employing a reaction extruder.

The invention will be described further with reference to the following examples which are intended for purposes of illustration. The scope of the invention is to be limited solely by the scope of the claims appended hereto.

EXAMPLE 1

A reaction mixture is prepared containing:

34.60 kg of a polybutylene glycol-ethylene glycol adipic acid polyester with an OH-number of 56 and a molecular weight of 2000.
27.70 kg of 1,6-hexamethylene diisocyanate
6.00 kg of neopentyl glycol
4.00 kg diethylene glycol
5.00 kg 1,4-butane diol.

This mixture has a characteristic number of 98.

Method of Preparation

The polyurethane is prepared by a single-step process. The glycols, polyester and diisocyanate are placed in a reaction vessel and heated to 60° C. while being stirred. Due to the exothermic nature of the reaction, the reaction temperature rises in about 20 minutes to 200° C. At this point the polyurethane is poured into flat receptacles.

| Properties of the Polyurethane | |
|---|---|
| Melting Range: | 115 to 125° C. |
| (as measured on a Kofler heating bench) | |
| Melting Index: | 40 g/10 min |
| (2.16 kg at 140° C.) | |
| Strength Properties | |
| of a Pressed Foil 0.3 mm Thick | |
| Tensile Strength (N/mm$^2$): | 11.5 |
| (as per DIN 53371) | |
| Ultimate Elongation (%): | 560 |
| (as per DIN 53371) | |
| Tear Propagation resistance (N/mm): | 43.4 |
| (as per DIN 53356) | |

EXAMPLE 1A

A reaction mixture is prepared containing:

20.00 kg of a polybutylene glycol-ethylene glycol adipic acid polyester with an OH-number of 56 and a molecular weight of 2000
16.80 kg of 1,6-hexamethylene diisocyanate
4.37 kg of neopentyl glycol
4.50 kg of 1,4-butane diol.

The mixture has a characteristic number of 98. The polyurethane is prepared by the procedure described in Example 1.

| Properties | |
|---|---|
| Melting Range: | 120 to 130° C. |
| (Kofler heating bench) | |
| Melting Index: | 28.0 g/10 min |
| (2.16 kg at 140° C.) | |

Adhesion: Comparison of the polyurethanes of Examples 1 and 1A

Polyurethane powders of the products of Examples 1 and 1A were each uninformly applied to a viscose fiber vlies (weight 30 gms/m$^2$). 30 gms/m$^2$ of the powder was applied. The powder which had a particle size of about 200 to 400 μm was obtained by milling the granulate of Examples 1 and 1A. The powder was sintered-on for 3 minutes at 170° C. Thereupon, the samples were pressed with: A) a polyester-cotton fabric; and B) a cotton-poplin fabric, under the following conditions: 12 seconds at 150° C., and a pressure of 350 g/cm². The samples obtained were examined with reference to:
(1) Primary adhesion to polyester-cotton fabric
(2) Adhesion after cleaning with perchloroethylene
(3) Primary adhesion to cotton-poplin fabric
(4) Adhesion after washing at 60° C.

The adhesion values for 1 through 4 are summarized by the following table:

| | Adhesion N per 5 cm strip width | | | |
|---|---|---|---|---|
| | 1 | 2 | 3 | 4 |
| Polyurethane of Example 1 | 14.0 | 15.0 | 26.0 | 21.0 |
| Polyurethane of Example 1A | 5.8 | 4.1 | 11.7 | 8.2 |

As is evident from the table, the polyurethane prepared in Example 1, which contains diethylene glycol as well as neopentyl glycol as a starting component leads in all cases to higher adhesion values than the polyurethane sample prepared in accordance with Example 1A which, unlike Example 1, does not include diethylene glycol.

EXAMPLE 2

A reaction mixture is prepared containing:
20.00 kg of a polybutylene glycol-ethylene glycol adipic acid polyester with an OH-number of 56 and a molecular weight of 2000
12.00 kg 1,6-hexamethylene diisocyanate
2.08 kg neopentyl glycol
2.69 kg 1,6-hexane diol
1.80 kg 1,4-butane diol The mixture has a characteristic number of 98. The polyurethane is prepared in accordance with the procedure of Example 1.

| Properties | |
|---|---|
| Melting Range: (Kofler heating bench) | 120 to 130° C. |
| Melting Index: (2.16 kg at 140° C.) | 44.0 g/10 min |
| Strength Properties of a Pressed Foil 0.3 mm Thick | |
| Tensile Strength (N/mm²): (as per DIN 53371) | 16.8 |
| Ultimate Elongation (%) (as per DIN 53371) | 650 |
| Tear Propagation Resistance (N/mm) (as per DIN 53356) | 48.5 |

EXAMPLE 3

A reaction mixture is prepared containing:
20.00 kg of a polybutylene glycol-ethylene glycol adipic acid polyester with an OH-number of 56 and a molecular weight of 2000
12.00 kg 1,6-hexamethylene diisocyanate
1.66 kg neopentyl glycol
2.69 kg 1,6-hexane diol
2.16 kg 1,4-butane diol The mixture has a characteristic number of 98. The polyurethane is prepared in accordance with the procedure of Example 1.

| Properties | |
|---|---|
| Melting Range: (Kofler heating bench) | 120 to 130° C. |
| Melting Index: (2.16 kg at 140° C.) | 53.0 g/10 min |
| Strength Properties of a Pressed Foil 0.3 mm Thick | |
| Tensile Strength (N/mm²): (as per DIN 53371) | 17.2 |
| Ultimate Elongation (%): (as per DIN 53371) | 580 |
| Tear Propagation Resistance (N/mm): (as per DIN 53356) | 57.0 |

The polyurethanes prepared in accordance with Examples 2 and 3 which, in contrast to the polyurethane of Example 1, contain a substantially smaller amount of neopentyl glycol in the mixture of the low-molecular glycols, exhibit distinctly better strength values. The melting point, however, is insignificantly increased since here, as in Examples 1 and 1A, a mixture of three low molecular weight glycols is employed.

This invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those skilled in the art will readily understand. Accordingly such variations and modifications of the disclosed embodiments are considered to be within the scope of this invention and the following claims.

We claim:

1. A method for preparing a polyurethane which melts below about 150° C. which comprises preparing a chain-extended polyurethane from at least one diisocyanate, at least one polydiol having a molecular weight between about 500 and 5000, and at least three diols wherein at least one diol is branched or includes an ether group, and wherein at least one diol is unbranched, said diols having a molecular weight of less than about 500; and wherein the hydroxyl group content of the reaction mixture exceeds or equals the isocyanate content of the reaction mixture.

2. The method according to claim 1 wherein
   (a) said polyurethane is prepared by heating a solvent-free mixture of said diisocyanate, polyol and diol components, wherein said reaction mixture contains at least three diols, and
   (b) in said reaction mixture the ratio of isocyanate groups/hydroxyl groups×100 is within the range of from about 96 to about 100.

3. The method according to claim 2 wherein the mole ratio of said branched or ether group containing diols, to said unbranched diols is within the range of from about 20:80 to about 75:25.

4. The method according to claim 3 wherein said branched diol component of the reaction mixture is selected from the group consisting of neopentyl glycol, 2,2'-diethylpropane-1,3-diol, and diethylene glycol and said unbranched diol component, is selected from the group consisting of ethylene glycol, 1,4-butane diol or 1,6-hexane diol.

5. The method according to claims 3 or 4 wherein the ratio of isocyanate groups/hydroxyl groups×100 in said reaction mixture is within the range of from about 97 to about 99.

6. The method according to claims 3 or 4 wherein said polyol is a polyester having a molecular weight of from about 1000 to about 2000.

7. The method according to claim 6 wherein said polyester is a polybutylene glycol-ethylene glycol adipic acid polyester.

8. The method according to claims 3 or 4 wherein said diisocyanate is selected from the group consisting of aliphatic, cycloaliphatic, and aromatic diisocyanates; and said polyol is a polyester having a molecular weight from about 1000 to 2000.

9. The method according to claim 8 wherein said aliphatic diisocyanate is selected from the group consisting of 1,6-hexamethylene-diisocyanate and 2,2,4-trimethylhexane-1,6-diisocyanate; said aromatic diisocyanate is selected from the group consisting of 4,4'-diphenylmethane-diisocyanate, carbodiimide-modified 4,4'-diphenylmethane-diisocyanate and ditolyl diisocyanate; and said cycloaliphatic diisocyanate is isophorone diisocyanate.

10. The method according to claims 3 or 4 wherein said diisocyanate is 1,6-hexamethylene-diisocyanate.

11. The method according to claim 3 wherein said reaction mixture comprises polybutylene glycol-ethylene glycol adipic acid polyester having an OH-number of about 56 and a molecular weight of about 2000; 1,6-hexamethylene diisocyanate, neopentyl glycol, 1,6-hexane diol and 1,4-butane diol, wherein the ratio of isocyanate groups/hydroxyl groups in said mixture is about 98.

12. The method according to claim 4 wherein said diol component is comprised of neopentyl glycol, 1,6-hexane diol and 1,4-butane diol.

13. The method according to claims 3 or 4 wherein said mixture further includes at least one monofunctional compound having an active hydrogen, wherein said monofunctional compounds are selected from the group consisting of the amines, amides and alcohols; wherein the amount of said monofunctional compounds comprises up to about 5 mole percent of the total amount of said low molecular weight diols in said reaction mixture.

14. The method according to claim 13 wherein said monofunctional compound is selected from the group consisting of dibutylamine, $\epsilon$-caprolactam, neopentyl alcohol or mixtures thereof.

15. The low-melting polyurethane prepared in accordance with the method of claims 1, 2, 3, 4, 11 or 12.

16. The low-melting polyurethane prepared in accordance with the method of claim 5.

17. The low-melting polyurethane prepared in accordance with the method of claim 6.

18. The low-melting polyurethane prepared in accordance with the method of claim 7.

19. The low-melting polyurethane prepared in accordance with the method of claim 8.

20. The low-melting polyurethane prepared in accordance with the method of claim 9.

21. The low-melting polyurethane prepared in accordance with the method of claim 10.

22. The low-melting polyurethane prepared in accordance with the method of claim 13.

23. The low-melting polyurethane prepared in accordance with the method of claim 14.

24. A method for the preparation of a low-melting polyurethane which melts below about 130° C. which comprises preparing a chain-extended polyurethane by heating a solvent free mixture of a diisocyanate, a polybutylene glycol-ethylene glycol adipic acid polyester and a mixture of at least three diols wherein at least one of said diols has alkyl side chains or ether groups, and at least one of said diols does not have alkyl side chains, said diols having a molecular weight of less than about 500; wherein in said reaction mixture the ratio of isocyanate groups/hydroxyl groups times 100 is within the range of from about 96 to about 100.

25. The method of claim 24 wherein said diol mixture is neopentyl glycol, diethylene glycol and 1,4-butane diol or neopentyl glycol, 1,6-hexane diol and 1,4-butane diol.

26. The low-melting polyurethane prepared in accordance with claims 24 or 25.

* * * * *